(12) United States Patent
Hurlock et al.

(10) Patent No.: US 6,473,834 B1
(45) Date of Patent: Oct. 29, 2002

(54) METHOD AND APPARATUS FOR PREVENT STALLING OF CACHE READS DURING RETURN OF MULTIPLE DATA WORDS

(75) Inventors: Steven T. Hurlock, Wynnewood, PA (US); Stanley P. Naddeo, Wayne, PA (US)

(73) Assignee: Unisys, Blue Bell, PA (US)

( * ) Notice: Subject to any disclaimer, the term of this patent is extended or adjusted under 35 U.S.C. 154(b) by 0 days.

(21) Appl. No.: 09/469,903

(22) Filed: Dec. 22, 1999

(51) Int. Cl.$^7$ .............................................. G06F 12/00
(52) U.S. Cl. ........................ 711/122; 711/138; 711/170
(58) Field of Search ................................ 711/117, 118, 711/119, 122, 128, 133, 140, 207, 138, 171, 3, 170; 710/52, 112, 31; 712/23, 207; 714/8; 345/552, 557

(56) References Cited

U.S. PATENT DOCUMENTS

| | | | |
|---|---|---|---|
| 4,159,532 A | 6/1979 | Getson, Jr. et al. | 711/118 |
| 4,774,687 A | 9/1988 | Taniguchi et al. | 711/117 |
| 4,802,086 A | 1/1989 | Gay et al. | 711/133 |
| 5,023,776 A | 6/1991 | Gregor | 711/122 |
| 5,117,493 A | 5/1992 | Jensen | 711/140 |
| 5,155,825 A | 10/1992 | Moughanni et al. | 711/207 |
| 5,333,296 A * | 7/1994 | Bouchard et al. | 711/171 |
| 5,353,426 A | 10/1994 | Patel et al. | 711/118 |
| 5,363,486 A | 11/1994 | Olson et al. | 711/3 |
| 5,506,967 A | 4/1996 | Barajas et al. | 711/118 |
| 5,524,220 A * | 6/1996 | Verma et al. | 712/207 |
| 5,535,340 A * | 7/1996 | Bell et al. | 710/112 |
| 5,539,895 A | 7/1996 | Bishop et al. | 711/138 |
| 5,544,340 A | 8/1996 | Doi et al. | 711/118 |
| 5,561,779 A | 10/1996 | Jackson et al. | 711/122 |
| 5,579,473 A * | 11/1996 | Schlapp et al. | 345/557 |
| 5,579,503 A | 11/1996 | Osborne | 711/119 |
| 5,590,379 A | 12/1996 | Hassler et al. | 710/31 |
| 5,664,145 A | 9/1997 | Apperley et al. | 711/117 |
| 5,666,482 A | 9/1997 | McClure | 714/8 |
| 5,687,348 A | 11/1997 | Whittaker | 711/133 |
| 5,708,837 A | 1/1998 | Handlogten | 712/23 |
| 5,715,425 A | 2/1998 | Goldman et al. | 711/128 |
| 5,831,640 A | 11/1998 | Wang et al. | 345/552 |
| 6,000,011 A * | 12/1999 | Freerksen et al. | 711/118 |
| 6,000,012 A * | 12/1999 | Freerksen et al. | 711/118 |
| 6,112,267 A * | 8/2000 | McCormack et al. | 710/52 |
| 6,145,032 A * | 11/2000 | Bannister et al. | 710/52 |
| 6,145,054 A * | 11/2000 | Mehrotra et al. | 711/119 |
| 6,148,372 A * | 11/2000 | Mehrotra et al. | 711/122 |
| 6,173,369 B1 * | 1/2001 | Nguyen et al. | 711/140 |

* cited by examiner

Primary Examiner—David Hudspeth
Assistant Examiner—Fred F. Tzeng
(74) Attorney, Agent, or Firm—Woodcock & Washburn; Lise A. Rode; Mark T. Starr

(57) ABSTRACT

In a data processing system comprising a first level cache, a second level cache, and a processor return path, wherein only one of the first level cache and second level cache can control the processor return path at a given time, an improvement comprises a queue disposed between an output of the first level cache and the processor return path to buffer data output from the first level cache so that the first level cache can continue to process memory requests even though the second level cache has control of the processor return path.

6 Claims, 3 Drawing Sheets

METHOD AND APPARATUS FOR PREVENT STALLING OF CACHE READS DURING RETURN OF MULTIPLE DATA WORDS

FIELD OF THE INVENTION

The present invention is directed to computer processors, and more particularly, to a queuing mechanism in a computer processor for preventing stalling of cache reads during return of multiple data words.

BACKGROUND

FIG. 1 is a block diagram of a prior art computer system that may comprise one or more central processing units (CPU), only one of which is illustrated in FIG. 1 at 10. The CPU 10 comprises a code unit (CU) 16, an execution unit (EU) 18, a reference unit (RU) 20, and a first-level cache (FLC) 22. The FLC 22 interfaces to a second-level cache (SLC) 12, which, in turn, interfaces to a main memory 14.

The code unit 16 retrieves instructions from the main memory 14 and partially decodes them. The reference unit 20 resolves memory references in the instructions decoded by code unit 16. The execution unit 18 executes the decoded instructions after any memory references have been resolved and the data has been retrieved from the main memory 14 or one of the caches 12, 22.

When the reference unit 20 attempts to resolve a memory reference from an instruction, it passes a virtual memory address to an address conversion unit (ACU) (not shown in FIG. 1) that translates the virtual address into an absolute address. The ACU then passes the absolute address to the FLC 22. If the FLC 22 determines that the data at the reference address is already present to in its cache memory, the data is retrieved from the cache memory and passed to the execution unit 18. If the data is not present in the FLC, then the FLC initiates a request for the data to the SLC 12. If the data is present in the SLC 12, the SLC will retrieve the data from its cache memory and pass it to the execution unit 18. If the data is not present in the SLC 12, then the SLC will initiate a fetch operation to retrieve the data from the main memory 14. The data retrieved from the main memory 14 will then be passed to the execution unit 18, and a copy of the data will be stored in the SLC 12.

Data is fetched from the main memory 14 and stored in the FLC 22 and SLC 12 in four-word sets, i.e., each cache line comprises four words. Each word comprises six bytes of data. The FLC 22 is implemented as a two-way set associative cache memory, and the SLC 12 is implemented as a one-way set associative cache memory. Each cache memory contains a first random-access memory (RAM) (not shown) for storing the four-word data sets fetched from the main memory 14, and a second RAM (not shown) for storing the cache tag values associated with each four-word data set in the first RAM.

FIG. 2 is a block diagram providing further details of the computer system of FIG. 1. As shown, the FLC 22 receives memory addresses and associated routing information from the ACU 24 of the reference unit 20 via a bus. Data retrieved from the FLC 22 or the SLC 12 is passed to the other units 16, 18, 20 of the CPU 10 via a processor return path 28. The FLC 22 and SLC 12 interface to the processor return path 28 via respective buses 34 and 38. Function $f_1$ and multiplexer 26 represent the priority scheme for control of the processor return path 28. Only one of the caches 12, 22 can have access to the processor return path 28 at a time. The width of the processor return path is one word. Thus, both the FLC 22 and the SLC 12 must pass the four-words of a given cache line to the processor return path 28, one word at a time. The SLC 12 has priority over the FLC 22.

Logic implementing a second function, $f_0$, in combination with a memory reference table (MRT), controls the flow of address and data information among the ACU 24, SLC 12, FLC 22, and processor return path 28, as described more fully below.

In use, the ACU 24 issues a memory request to the FLC 22. The request includes a memory address and routing information that specifies to which other part of the processor (EU, RU, or CU) the data should be routed over the processor return path 28. If there is a hit in the FLC 22 (i.e., the data is present), then the data is read out of the FLC 22 and delivered to the processor return path 28 via bus 34. A signal indicating whether a "hit" occurs or not, is provided to the logic, $f_0$.

If there is no hit, the logic, $f_0$, forwards the request to the SLC 12 and makes an entry in the MRT 30. The entry comprises a job number associated with the request, a word number (i.e., the address of the requested memory word), and the routing information for the requested word.

The SLC 22 returns four data words at a time, one word per clock, to both the FLC 12 and the processor return path 28 (via bus 38). More specifically, the four words that are read out of the SLC 12 are stored as a new cache line in the FLC 22. The MRT 30 is then accessed to determine which pending requests are satisfied by the four words returned from the SLC 12. It is possible that the four words returned by the SLC 12 satisfy more than one pending request entry in the MRT 30. When a match is found in the MRT 30, the requested word, along with its routing information, is sent to the processor return path 28.

Because the SLC 12 has priority over the FLC 22 for control of the processor return path 28, a bottleneck can occur when a cache line (four words) returned by the SLC 12 satisfies multiple pending request entries in the MRT 30. In this situation, the processor return path 28 will be tied up for multiple clocks as the words for each satisfied entry are sent over the processor return path 28 one word at a time. During this time, because the FLC 22 cannot access the processor return path 28, it will hold up any new memory requests from the ACU 24 that hit in the FLC 22 (via a "hold" signal sent to the ACU by logic, $f_0$). Subsequent requests, even if they would ultimately have been forwarded to the SLC 22 as a result of an FLC "miss", are also held up. Thus, subsequent requests that would have been forwarded to the SLC 22 are delayed until the FLC 12 can service the first request (i.e., until the processor return path becomes available). This increases the FLC-to-SLC latency. Consequently, there is a need for an improved cache design that overcomes this limitation and reduces the likelihood that memory requests to the FLC and SLC will be held-up when the processor return path is busy. The present invention satisfies this need.

SUMMARY OF THE INVENTION

In a data processing system comprising a first level cache, a second level cache, and a processor return path, wherein only one of the first level cache and second level cache can control the processor return path at a given time, an improvement comprises a queue disposed between an output of the first level cache and the processor return path to buffer data output from the first level cache so that the first level cache can continue to process memory requests even though the second level cache has control of the processor return path. Preferably, the queue comprises a first-in, first-out queue. According to a further aspect of the present invention, the processor return path of the system accepts one word per clock cycle, the second level cache output two data words per clock cycle, and the system further comprises a second queue disposed between the output of the second level cache and the processor return path for buffering data output from the second level cache so that it can be provided to the processor return path one word per clock cycle.

A method according to the present invention, for use in a system comprising a first level cache, a second level cache, and a processor return path, wherein only one of the first level cache and second level cache can access the processor return path at a given time, comprises the step of buffering data output from the first level cache to be passed to the processor return path so that the first level cache can continue to process memory requests even though the second level cache has access to the processor return path. Preferably, the data is buffered in accordance with a first-in, first-out algorithm. In a system in which the processor return path can accept one word per clock cycle but the second level cache can output two data words per clock cycle, the present invention further comprises the step of buffering data output from the second level cache at the rate of two words per clock cycle so that the data can be provided to the processor return path at a rate of one word per clock cycle.

Additional features and advantages of the present invention will become evident hereinafter.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings.

DETAILED DESCRIPTION OF THE PREFERRED EMBODIMENT

Figure 3:
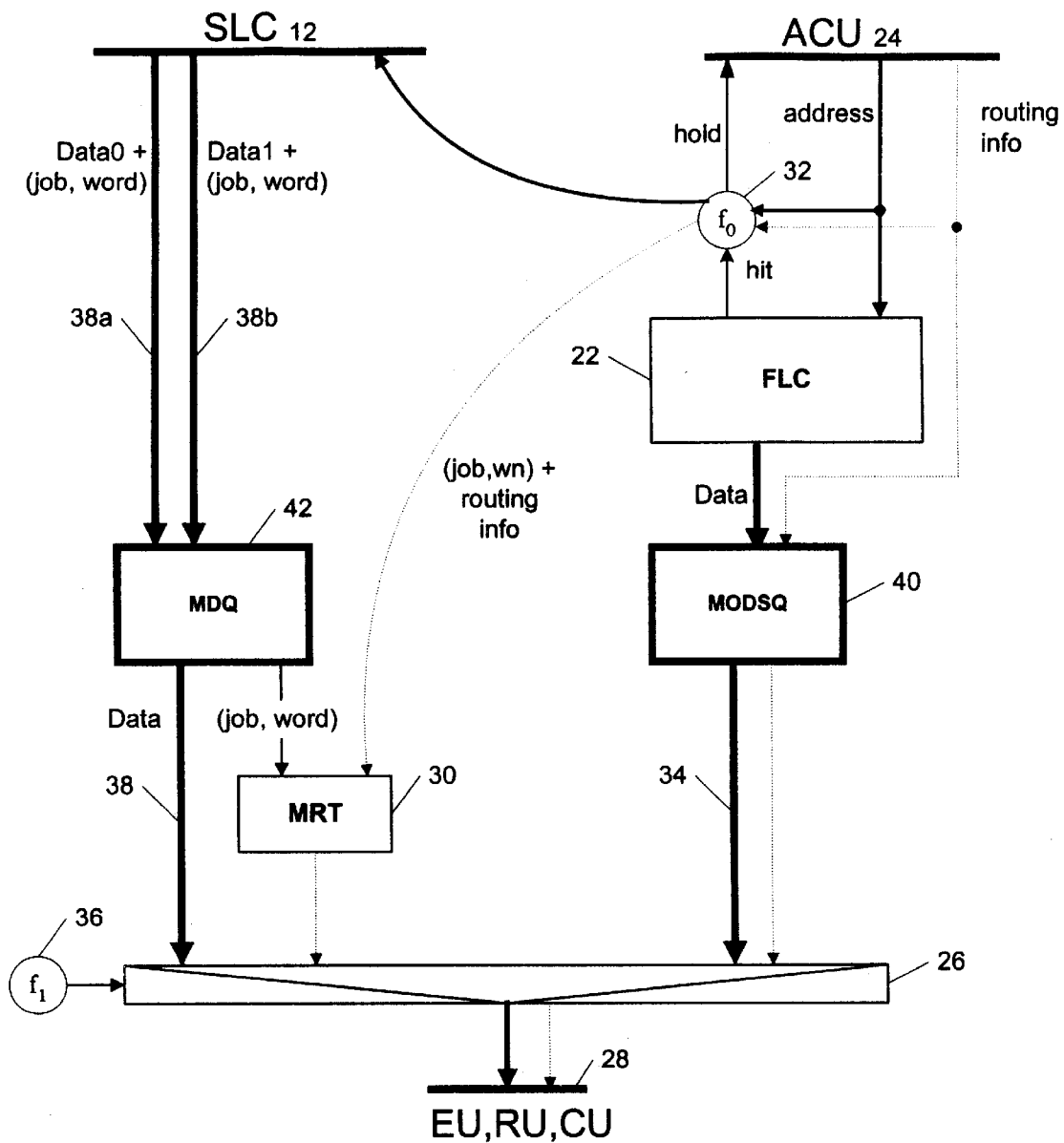
FIG. 3 is a block diagram of an improved computer system in accordance with a preferred embodiment of the present invention.

Referring to the drawings, wherein like numerals represent like elements throughout, FIG. 3 illustrates an improved computer system in accordance with a preferred embodiment of the present invention.

According to a preferred embodiment of one aspect of the present invention, to reduce the likelihood that memory requests to the FLC 22 will be held up when the SLC 12 has control of the processor return path 22, a queue (MODSQ) 40 is placed between the output of the FLC 22 and the input to the multiplexer 26 that interfaces to the processor return path 28.

Figure 1:
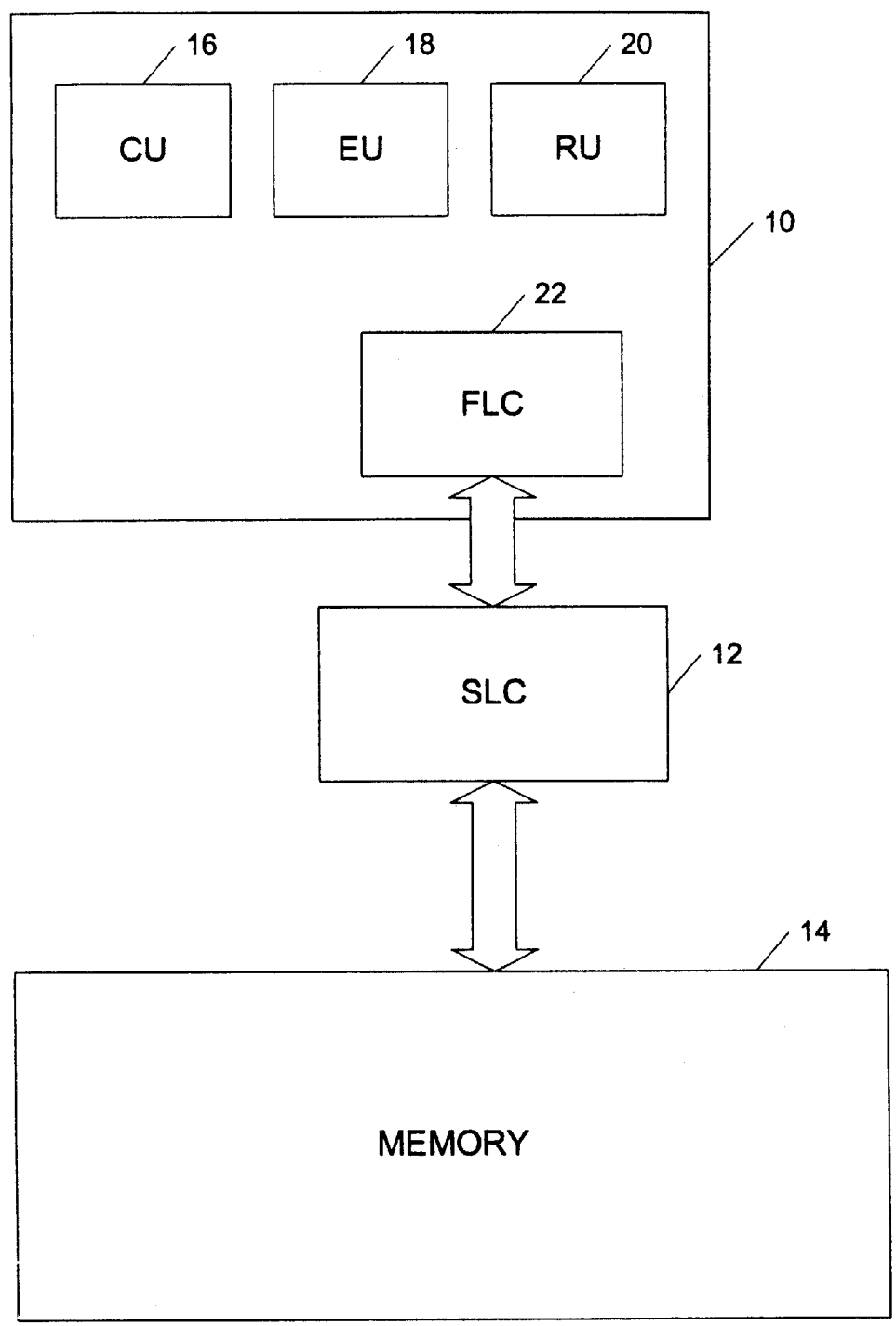
FIG. 1 is a block diagram of a prior art computer system.
Figure 2:
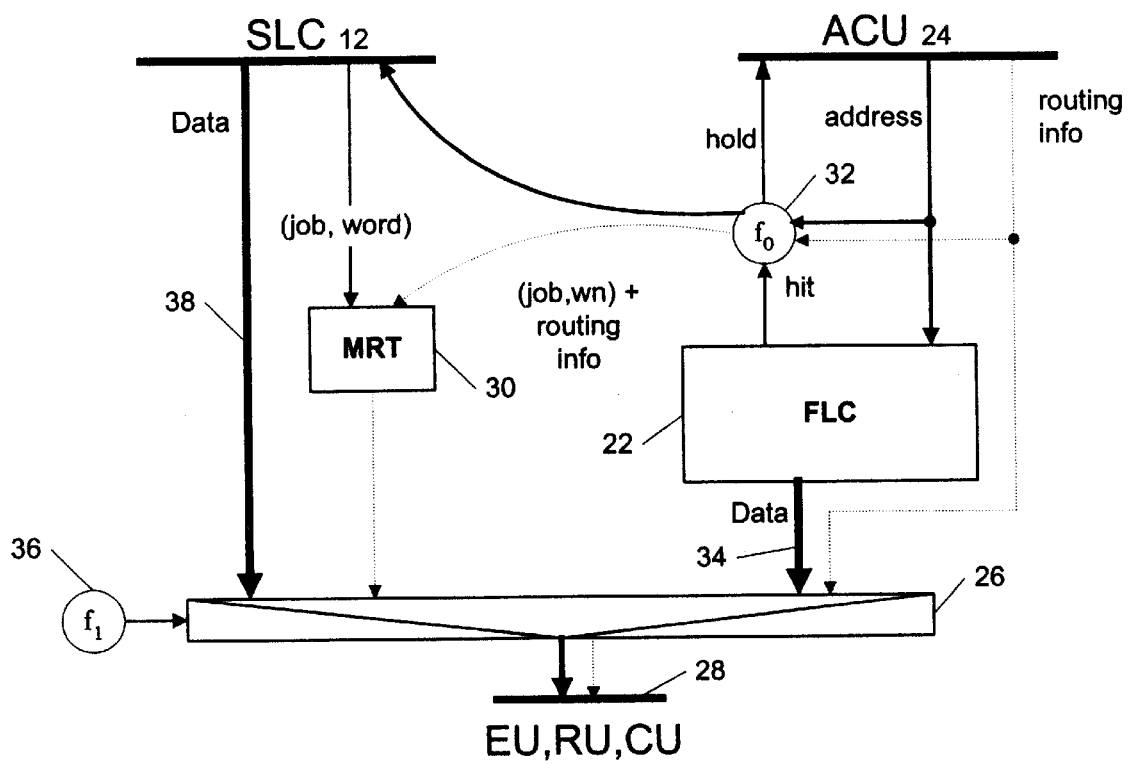
FIG. 2 is a block diagram providing further details of the computer system of FIG. 1.

In use, the FLC 22 will receive a memory request and determine whether the requested word is present in the FLC, as before. If the data is present and the processor return path is not in use by the SLC 12, then the requested data will be read out and delivered to the processor return path 28 via bus 34 and multiplexer 26. Unlike in the prior art design of FIG. 2, however, if the requested data is present in the FLC 22, but the processor return path 28 is in use by the SLC 12, the FLC 22 will not hold up the request and any subsequent requests. Rather, the data will be read out of the FLC 22 and delivered to the MODSQ 40. Entries in the MODSQ 40 are then delivered to the processor return path 28 (via priority function $f_1$ and multiplexer 26) when the processor return path becomes available.

Preferably, the MODSQ 40 implements a first-in, first-out algorithm, and entries in the MODSQ 40 are read out of the queue and delivered to the processor return path 28 whenever possible, i.e., whenever the MODSQ 40 output is selected by the priority function, $f_1$. In the present embodiment, the MODSQ has a depth of eight entries, but in other embodiments it can be made larger or smaller.

In the present embodiment, the priority function, $f_1$, selects the MDQ 42 output whenever there is valid data at that output. When no valid data is present at the output of the MDQ 42, the priority logic selects the MODSQ 40 output instead. When valid data is present at the outputs of both the MDQ 42 and the MODSQ 40, the output of the MDQ 42 is given priority. In other embodiments, however, additional conditions can be considered in making the priority determination. For example, in a case in which the CPU 10 needs to give fetches of certain kinds of data a higher priority, the priority function $f_1$ could shift its selection to the MODSQ 40 output until the data from such a fetch is returned. Other variations are equally possible.

According to another aspect of the present invention, the throughput of the improved computer system is further enhanced by widening the output of the SLC 12 to two words per clock. That is, two words of data (Data0, Data1) are read out of the SLC 12, in parallel, on each clock. One data word is read out on bus 38a, and the other is read out on bus 38b. As a result, the latency of SLC cache reads is cut in half when a "hit" occurs. However, because only one word can be returned on the processor return path 28 per clock, a second queue (MDQ) 42 is added that buffers the words read out of the SLC 12 on buses 38a and 38b, as well as the word number and job number associated with the current request, so that the words can be delivered to the processor return path 28 one word at a time (i.e., one word per clock cycle).

In the present embodiment, the MDQ 42 has the same number of locations as the MRT 30. When an entry (data word+job and word numbers) is processed from this queue, the job and word numbers are used as an index into the MRT to retrieve the routing information for the data. If multiple entries are found for the job/word, the queue is held until all entries for the word are processed.

Preferably, both the MODSQ 40 and the MDQ 42 have bypass mechanisms that allow data to be delivered directly to the queue's output. These mechanism can be enabled when there is only light traffic through the system.

As the foregoing illustrates, the present invention is directed to an improved caching method and apparatus. It is understood that changes may be made to the embodiments described above without departing from the broad inventive concepts thereof. Accordingly, the present invention is not limited to the particular embodiments disclosed, but is intended to cover all modifications that are within the spirit and scope of the invention as defined by the appended claims.

What is claimed is:

1. In a system comprising a first level cache, a second level cache, and a processor return path, wherein only one of the first level cache and second level cache can access the processor return path at a given time, an improvement comprising:

a queue disposed between an output of the first level cache and the processor return path to buffer data output from the first level cache as a result of a cache hit so that the first level cache can continue to process memory requests even though the second level cache has access to the processor return path.

2. The system recited in claim 1, wherein said queue comprises a first-in, first-out queue.

3. The system recited in claim 1, wherein the processor return path can accept only one word per clock cycle and the second level cache can output two data words per clock cycle, and wherein the system further comprises a second queue disposed between the output of the second level cache and the processor return path for buffering data output from the second level cache so that it can be provided to the processor return path one word per clock cycle.

4. In a system comprising a first level cache, a second level cache, and a processor return path, wherein only one of the first level cache and second level cache can access the processor return path at a given time, a method comprising:

temporarily buffering data output from the first level cache to be passed to the processor return path as a result of a cache hit so that the first level cache can continue to process memory requests even though the second level cache has access to the processor return path.

5. The method recited in claim 4, wherein said buffering step comprises temporarily buffering said data in accordance with a first-in, first-out algorithm.

6. The method recited in claim 4, wherein the processor return path can accept one word per clock cycle and the second level cache can output two data words per clock cycle, and wherein the method further comprises the step of buffering data output from the second level cache at a rate of two words per clock cycle so that said data can be provided to the processor return path at a rate of one word per clock cycle.

* * * * *